(12) United States Patent
Heller, Jr.

(10) Patent No.: US 7,641,705 B2
(45) Date of Patent: Jan. 5, 2010

(54) ELECTROCHEMICAL CELL WITH REDUCED HEIGHT FILLPORT

(75) Inventor: Bernard Frank Heller, Jr., Fridley, MN (US)

(73) Assignee: Medtronic, Inc., Minneapolis, MN (US)

( * ) Notice: Subject to any disclaimer, the term of this patent is extended or adjusted under 35 U.S.C. 154(b) by 856 days.

(21) Appl. No.: 10/974,378

(22) Filed: Oct. 27, 2004

(65) Prior Publication Data

US 2005/0084746 A1   Apr. 21, 2005

(51) Int. Cl.
*H01M 4/82* (2006.01)
*H01M 2/38* (2006.01)
*H01M 2/12* (2006.01)
*H01M 10/44* (2006.01)
*H01M 2/00* (2006.01)

(52) U.S. Cl. .................. 29/623.2; 429/80; 429/89; 429/52; 429/63

(58) Field of Classification Search ............. 29/623.2; 429/80, 89, 52, 63
See application file for complete search history.

(56) References Cited

U.S. PATENT DOCUMENTS

| | | | |
|---|---|---|---|
| 3,953,228 A | 4/1976 | Roth et al. | |
| 4,182,028 A | 1/1980 | Epstein et al. | |
| 4,242,425 A | 12/1980 | O'Boyle et al. | |
| 4,329,405 A * | 5/1982 | Zupancic | 429/56 |
| 4,542,080 A | 9/1985 | Phillips et al. | |
| 4,544,078 A | 10/1985 | Arenas et al. | |
| 4,592,970 A * | 6/1986 | Zupancic | 429/82 |
| 4,611,395 A | 9/1986 | Phillips et al. | |
| 4,695,519 A | 9/1987 | Rao et al. | |
| 4,748,094 A | 5/1988 | Howard et al. | |
| 4,913,986 A | 4/1990 | Howard et al. | |
| 5,004,656 A | 4/1991 | Sato et al. | |
| 5,015,542 A * | 5/1991 | Chaney et al. | 429/56 |
| 5,114,808 A | 5/1992 | Chaney, Jr. et al. | |

(Continued)

FOREIGN PATENT DOCUMENTS

EP    1 148 562 A    10/2001

OTHER PUBLICATIONS

The Random House Dictionary, Jess Stein, 1980, The Random House, Inc. Secton A, p. 61.*

(Continued)

*Primary Examiner*—Patrick Ryan
*Assistant Examiner*—Helen O Chu
(74) *Attorney, Agent, or Firm*—Dicke, Billig & Czaja, PLLC

(57) ABSTRACT

An electrochemical cell including a cell enclosure, a fill tube, a ball, a closing button, an anode, a cathode, and an electrolyte. The cell enclosure defines an internal volume and includes a cover forming a fillport through hole. The fill tube is separately formed, and defines a leading section, a trailing section, and a passageway. The leading section is secured within the fillport through hole. The ball is sealingly secured within the passageway. The closing button is also separately formed, and is sealingly secured within the fillport through hole adjacent the leading section of the fill tube. The anode, cathode, and electrolyte are maintained within the internal volume. By configuring the fill tube such that the leading section thereof is secured within the fillport through hole, an overall extension of the fill tube relative to the internal volume is greatly reduced, thereby maximizing a volumetric efficiency.

11 Claims, 2 Drawing Sheets

U.S. PATENT DOCUMENTS

| | | | |
|---|---|---|---|
| 5,173,375 A | 12/1992 | Cretzmeyer et al. | |
| 5,312,458 A | 5/1994 | Muffoletto et al. | |
| 5,500,026 A | 3/1996 | Heller et al. | |
| 5,716,729 A * | 2/1998 | Sunderland et al. | 429/66 |
| 5,744,261 A | 4/1998 | Muffoletto et al. | |
| 5,776,632 A | 7/1998 | Honegger | |
| 5,882,362 A | 3/1999 | Muffoletto et al. | |
| 6,004,692 A | 12/1999 | Muffoletto et al. | |
| 6,010,803 A | 1/2000 | Heller, Jr. et al. | |
| 6,040,082 A | 3/2000 | Haas et al. | |
| 6,117,195 A | 9/2000 | Honegger | |
| 6,132,896 A | 10/2000 | Sunderland et al. | |
| 6,157,531 A | 12/2000 | Breyen et al. | |
| 6,171,729 B1 | 1/2001 | Gan et al. | |
| 6,174,338 B1 | 1/2001 | Heller, Jr. | |
| 6,203,937 B1 * | 3/2001 | Kraska | 429/89 |
| 2002/0114991 A1 * | 8/2002 | Hallifax et al. | 429/53 |

OTHER PUBLICATIONS

PCT Search Report mailed Dec. 19, 2003 (6 pgs).

* cited by examiner

ELECTROCHEMICAL CELL WITH REDUCED HEIGHT FILLPORT

BACKGROUND OF THE INVENTION

The present invention relates to an electrochemical cell intended for powering implantable medical devices. More particularly, it relates to a liquid electrolyte-type electrochemical cell having a reduced height fillport sealing design.

A variety of different implantable medical devices (IMD) include one or more self-contained power sources that power the various components of the IMD. For example, implantable, programmable drug delivery devices (e.g., used to treat pain, spasticity, and cancer), IMDs useful for therapeutic stimulation of the heart, such as implantable cardioverter-defibrillators, pacemakers, etc., typically incorporate one or more power sources. Numerous other battery-powered implantable medical devices are further available.

Regardless of the exact construction and application, suitable power sources or batteries for IMD's are virtually always electrochemical in nature, commonly referred to as an electrochemical cell. Acceptable electrochemical cells for IMDs typically include a cell enclosure or encasement maintaining various components including an anode, a separator, a cathode, and an electrolyte, and are well known in the art. In general terms, the anode material is typically a lithium metal, or, for rechargeable cells, a lithium ion-containing body. Lithium batteries are generally regarded as acceptable power sources due in part to their high energy density and low self-discharge characteristics relative to other types of batteries. The cathode material is typically metal-based, such as silver vanadium oxide (SVO), manganese dioxide, etc. The electrolyte can also assume a variety of forms such as propylene carbonate containing a dissolved salt such as lithium perchlorate, etc.

As previously described, the various components of the electrochemical cell are maintained within a cell enclosure. Depending upon the particular performance requirements of the electrochemical cell, construction of the anode, or cathode, or other components within the cell enclosure itself can vary. The electrolyte, however, is typically in liquid form, and thus must be dispensed or "charged" into the cell enclosure. As such, the cell enclosure itself is typically comprised of separate case and cover components, with the cover forming a fillport through which the electrolyte can be dispensed. Once a desired volume of electrolyte has been dispensed into the cell enclosure, the fillport is then sealed. In light of the intended bodily implant end-use, it is imperative that a complete, hermetic seal be formed that prevents passage of the electrolyte outwardly from the cell enclosure.

Various fillport sealing designs have been suggested for achieving a requisite hermetic seal. One accepted technique is to weld a separate cap or similar structure over the fillport following electrolyte charging, thereby sealing the fillport opening. Unfortunately, this welding operation may conduct heat to the electrolyte, potentially leading to some electrolyte evaporation. The evaporated electrolyte, in turn, may escape into the weld zone, possibly negatively affecting an integrity of the resulting weld (e.g., pin holes, etc.).

In light of the above weld seal integrity concerns, various other fillport designs have been implemented, whereby a primary seal and a secondary seal are created. In particular, a non-welded, secondary seal is initially formed, followed by a more conventional welded primary seal. With this technique, the secondary seal prevents evaporated electrolyte gases from escaping, and thus from negatively affecting the subsequent weld-type seal.

The prevailing technique for establishing the secondary seal is to press-fit an insert piece within the fillport opening itself or within some other component that is otherwise fluidly connected to the fillport opening. For example, U.S. Pat. No. 4,913,986 describes an electrochemical cell having a metal sleeve welded to (and extending outwardly from) the fillport opening in the cover. Following electrolyte dispensement, a plug is press-fitted or interference-fitted into the fillport opening, thereby establishing a secondary seal. Subsequently, a top of the sleeve is hermetically sealed by welding a metal cap in place. Other references, such as U.S. Pat. No. 5,776,632 to Honegger and U.S. Pat. No. 6,203,937 to Kraska similarly disclose an insert component (in particular, a sphere or ball) press fitted directly into the fillport opening formed by the cell's cover.

In order to consistently provide the requisite press-fit sealing between the insert and cover at the fillport opening, the above-described references inherently require that the cover, and in particular the fillport opening, be precisely machined, and requires subjecting both a top and bottom surface of the cover to a finishing operation. As a result, an overall cost of the electrochemical cell, and in particular the cover component, is greatly increased. Further, where, such as with Honegger, the primary weld is formed directly on the insert piece, the electrolyte is in contact with the insert, possibly affecting the subsequently formed weld due to direct conduction of heat. These concerns have been overcome by providing a separate fill tube component that otherwise receives the secondary sealing insert. For example, U.S. Pat. No. 6,132,896 to Sunderland et al. discloses an electrochemical cell having a separately formed fill tube welded to an interior (or bottom) of the cover about the fillport opening. The fill tube is precisely machined and sized to receive the insert (i.e., a ball) in a press-fitted relationship. The cover is still formed to define a fillport opening (within which a separate cap component is welded following the press-fitting operation); however, the cover need not adhere to rigorous dimensional standards, as the critical feature is between the inner diameter of the fill tube and the ball insert. Because only the fill tube is precisely machined, an overall cost of the electrochemical cell is reduced as compared to the previously described references in which an entirety of the cover must be exactingly formed. An additional feature associated with this fill tube design is providing a void between the press-fitting insert and the cap that is otherwise welded to the cover. In particular, a getter material, typically in the form of hollow glass bubbles, is placed within this void, and provides an auxiliary design feature for indicating or detecting gross leaks in the primary seal.

While highly viable and cost-effective, the evolution of electrochemical cells has raised potential drawbacks. In particular, an entirety of the fill tube extends below the cover (or within the headspace provided within the enclosure). By way of example, a length (or extension into the headspace) of a fill tube associated with available electrochemical cells is on the order of 2.03 mm (0.080 inch). With previous designs, this extension, and thus reduction in available headspace volume, was of little concern due to an overall size of the cell itself. As implantable medical devices continue to become smaller, the electrochemical cells utilized with these devices must also become smaller. Simply stated, future liquid electrolyte-type, electrochemical cells based upon a deep drawn case will need to be reduced in height for various applications. One of the issues associated with shorter cell sizes is utilization of the headspace in the cell to maximize capacity. In general terms, the headspace in these designs is the fixed volume in the cell directly below the cover for the cathode, feedthrough, the fillport components, and the cathode weld attachment. As electrochemical cells get shorter and smaller, this headspace volume remains constant in the cell and occupies a larger percentage of the overall available volume. Unfortunately, the currently employed fill tube assembly design inefficiently occupies a relatively large percentage of the available headspace volume. For a reduced-size, liquid electrolyte-type electrochemical cell, then, these volumetric inefficiencies require a reduction in size of the various active components (e.g., electrode), and thus a reduction in available energy. The energy reduction is undesirable.

Electrochemical cells continue to be highly important tools for powering various devices, and in particular implantable medical devices. To this end, while certain aspects of electrochemical cells, such as selected chemistries, anode or cathode construction, etc., continue to evolve, the accepted technique for effectuating fillport sealing has essentially remained unchanged. While the provision of a non-welded, secondary seal in conjunction with a welded, primary seal is well-accepted, the volumetric inefficiencies associated with current fill tube assembly designs may impede the ability to produce reduced-sized cells with acceptable available energy levels on a cost effective basis. Therefore, a need exists for an electrochemical cell having a low profile fillport sealing design.

BRIEF SUMMARY OF THE INVENTION

One aspect of the present invention relates to electrochemical cell including a cell enclosure, a fill tube, a ball, a closing button, an anode, a cathode, and an electrolyte. The cell enclosure defines an internal volume and includes a cover. In this regard, the cover forms an outer face, an inner face, and a fillport through hole. The fill tube is formed separate from the cell enclosure and defines a leading section, a trailing section, and a passageway. In this regard, the leading section is secured within the fillport through hole. The ball is sealingly secured within the passageway of the fill tube. The closing button is also formed separate from the cell enclosure and is sealingly secured within the fillport through hole adjacent the leading section of the fill tube. Finally, the anode, cathode, and electrolyte are contained within the internal volume, with the electrolyte electrically associating the anode and cathode components. By configuring the fill tube such that the leading section thereof is secured within the fillport through hole, an overall extension of the fill tube relative to the inner face of the cover is greatly reduced, thereby maximizing a volumetric efficiency of the electrochemical cell. In one preferred embodiment, inward extension of the fill tube relative to the inner face of the cover at the fillport through hole is less than 2.03 mm (0.08 inch), most preferably, 0.381 mm (0.015 inch).

Another aspect of the present invention relates to a cell enclosure for an electrochemical cell including an anode, a cathode, and an electrolyte. The cell enclosure includes a case, a cover, a fill tube, a ball, and a closing button. The cover forms a fillport through hole. The fill tube is formed apart from the cover and defines a leading section, a trailing section, and a passageway. In this regard, the leading section is secured within the fillport through hole such that only a portion of the fill tube extends beyond an inner face of the cover. The ball is sealingly secured within the passageway. The closing button is formed apart from the cover and is sealingly secured within the fillport through hole adjacent the leading section of the fill tube. In one preferred embodiment, the ball is formed of a material that is harder than a material selected for the fill tube. In an even more preferred embodiment, the ball is a Grade 5 titanium material, whereas the fill tube is a Grade 2 titanium material.

Yet another aspect of the present invention relates to a method of forming an electrochemical cell including an anode and a cathode. The method includes providing a case defining an upper opening. Further, a cover is provided that defines an outer face, an inner face, and a fillport through hole. A fill tube is formed apart from the cover, and defines a leading section, a trailing section, and a passageway. The leading section of the fill tube is secured within the fillport through hole such that the passageway is in fluid communication with the fillport through hole. The cover is sealed to the case at the upper opening, with the case and cover combining to define an internal volume. An electrolyte is dispensed into the internal volume via the fill tube passageway. A ball is pressed into the passageway of the fill tube to form a secondary seal. A closing button is placed into the fillport through hole downstream of the fill tube. Finally, the closing button is sealed to the cover to form a primary seal. In one preferred embodiment, the closing button is welded to the cover, with the secondary seal formed by the ball and the fill tube serving to prevent evaporated electrolyte gas from negatively affecting integrity of the weld. In another preferred embodiment, assembly of the closing button within the fillport through hole includes abutting the closing button against the fill tube.

DETAILED DESCRIPTION OF THE INVENTION

Figure 1:
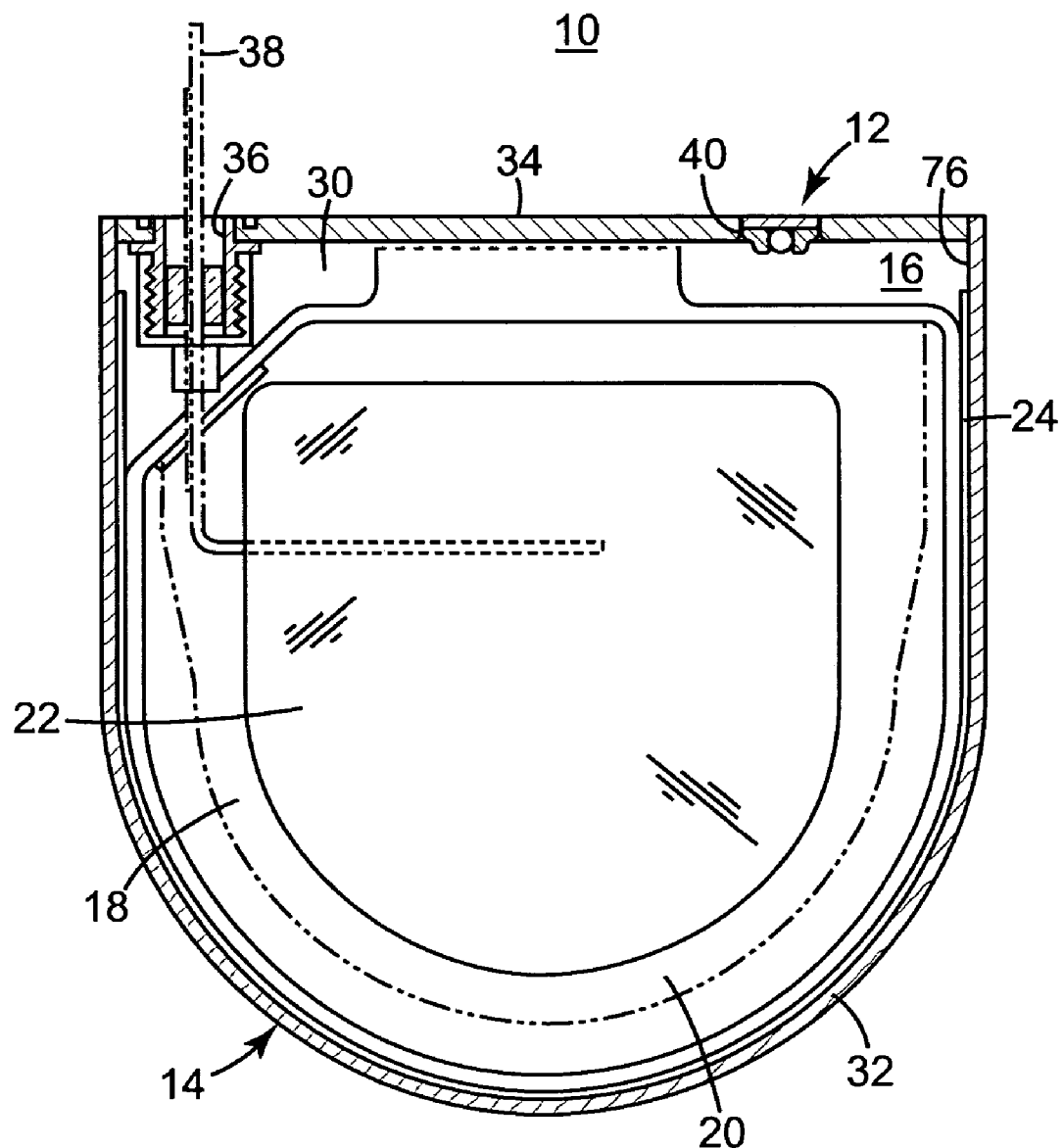
FIG. 1 is a cross-sectional, elevational view of a typical electrochemical cell including a fillport sealing assembly in accordance with the present invention.

One exemplary embodiment of an electrochemical cell 10 is illustrated in FIG. 1, and includes a fillport sealing assembly (referenced generally at 12) in accordance with one preferred embodiment of the present invention. In general terms, the electrochemical cell includes a cell enclosure 14 maintaining a variety of internal components including an electrolyte 16. The various components are described in greater detail below. In general terms, however, the fillport sealing assembly 12 is adapted to hermetically seal the electrolyte 16 within the cell enclosure 14, while occupying a minimal amount of the headspace volume.

The specific internal components associated with the electrochemical cell 10 can vary depending upon the desired end application. In one preferred embodiment, the electrochemical cell 10 is adapted to power an implantable medical device, such as an implantable drug pump, an implantable neurostimulator, an implantable cardiac pacemaker, a cardiomylo-stimulator, an implantable cardiac defibrillator, an implantable pacemaker/cardioverter/defibrillator, etc., all of which are well known in the art. Thus, the internal components otherwise associated with the electrochemical cell 10 can define the electrochemical cell 10 as a high-rate cell, medium-rate cell, or low-rate cell. Regardless, in addition to the electrolyte 16, the internal components maintained by the cell enclosure 14 include an anode 18 (referenced generally in FIG. 1) and a cathode 20 (referenced generally in FIG. 1). The anode 18 is preferably formed to include lithium. Materials for the cathode 20 are most preferably solid and comprise as active components thereof metal oxides such as vanadium oxide, silver vanadium oxide (SVO), or manganese dioxide as is known in the art. Alternatively, the cathode 20 may also comprise carbon monoflouride and hybrids thereof, or any other active electrolytic components and combinations.

It is to be understood that electrochemical systems other than those set forth explicitly above may also be utilized for the electrochemical cell 10, including, but not limited to, anode/cathode systems such as lithium/silver oxide; lithium/manganese oxide; lithium/$V_2O_5$; lithium/copper silver vanadium oxide; lithium/copper oxide; lithium/lead oxide; lithium/carbon monoflouride; lithium/chromium oxide; lithium/bismuth-containing oxide; lithium/copper sulfate; mixtures of various cathode materials listed above such as mixture of silver vanadium oxide and carbon monoflouride; and lithium ion re-chargeable batteries, to name but a few.

In conjunction with the selected materials for the anode 18 and the cathode 20, a variety of construction techniques can be employed, such as a spirally wound battery, stacked plate, serpentine electrodes, etc., all of which are known in the art. To this end, the electrochemical cell 10 may further include additional components such as an anode current collector 22, a cathode current collector 24, etc.

The electrolyte 16 can similarly assume a wide variety of forms as known in the art. For example, the electrolyte 16 can include an organic solvent in combination with an ionizing solute. The organic solvent can become, for example, diethyl carbonate, dimethyl carbonate, butylen carbonate, 3-methyl-2-oxazolidone, sulfolane, tetrahydrofuran, methyl-substituted tetrahydrofuran, 1-3 dioxolane, polypropylene carbonate, ethylene carbonate, gamma-butyrolactone, ethylene glycol sulfite, dimethylsulfite, dimethylsulfoxide, or mixtures thereof and also, for example, low viscosity cosolvents such as tetrahyrdofuran, methyl-substituted tetrahydrofuran, dioxolane, dimethyloxyethane, dimethyl isoxazole, diethyl carbonate, ethylene glycol sulfite, dioxane, dimethyl sulfite, or the like. The ionizing solutes can be a simple or double salt or mixtures thereof, for example, $LiBF_4$, $LiAsF_6$, $LiPF_6$, $LiClO_4$, $LiCF_3SO_3$, $Li(SO_3)(CF_3)_3$, $LiN(SOCl_2)_3$, or $LiC(SO_2CF_3)_2$, which will produce an ionically conductive solution when dissolved in one or more solvents.

Regardless of the exact construction of the anode 18, cathode 20, the electrolyte 16 (and other internal components), the cell enclosure 14 defines an internal volume 30 (referenced generally) within which the various components (e.g., the electrolyte 16, the anode 18, the cathode 20, etc.) are disposed. In this regard, the cell enclosure 14 preferably includes a case 32 (referenced generally in FIG. 1) and a cover 34. The case 32 and the cover 34 are preferably formed of a metal such as stainless steel or titanium, and are welded or otherwise sealed to one another upon final assembly.

The case 32 is illustrated in FIG. 1 as assuming a general D-shape. Alternatively, a variety of other shapes are equally acceptable. For example, the case 32 can be prismatic, rectangular, circular, etc. Similarly, the cover 34 can assume a variety of other shapes conforming with that of the case 32. Further, while the cover 34 is illustrated in FIG. 1 as providing an opening 36 for an appropriate electrical feedthrough 38, a variety of other feedthrough configurations are equally acceptable.

Figure 2:
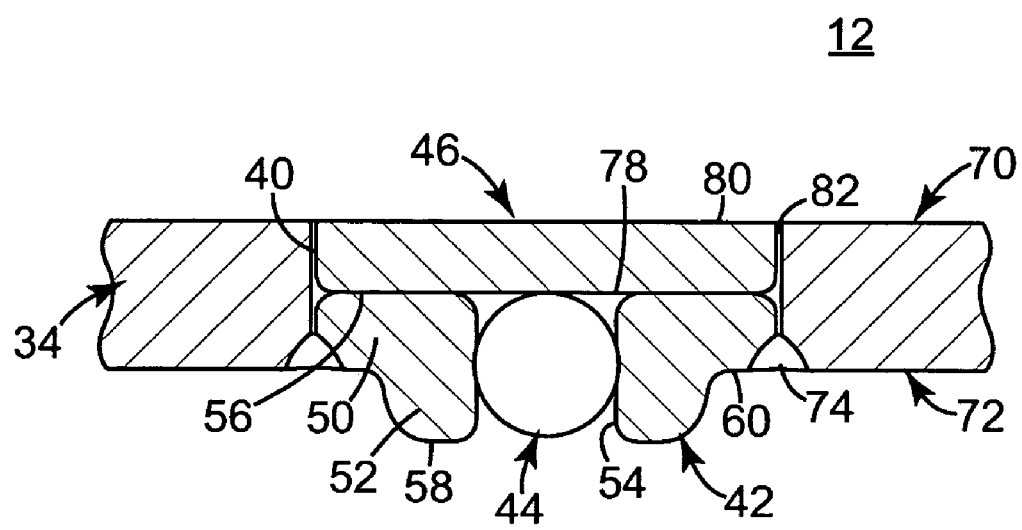
FIG. 2 is an enlarged, cross-sectional view of the fillport sealing assembly of FIG. 1.

Regardless of the exact electrochemical cell 10 construction, the preferred fillport sealing assembly 12 is shown in greater detail in FIG. 2. In particular, the cover 34 is illustrated as defining a fillport through hole 40. The sealing assembly 12 includes a fill tube 42, a spherical or ball insert 44, and a closing button 46. In general terms, at least a portion of the fill tube 42 is sealingly secured within the fillport through hole 40. The ball 44 is sealingly disposed within the fill tube 42. Finally, the closing button 46 is sealingly secured within the fillport through hole 40 above the fill tube 42 (relative to the orientation of FIG. 2). The dual seal design prevents electrolyte 16 (FIG. 1) leakage, as described in greater detail below.

The fill tube 42 is sized in accordance with the fillport through hole 40, and preferably defines a leading section 50, a trailing section 52, and a passageway 54. The leading section 50 defines an outer transverse diameter approximating a diameter of the fillport through hole 40, and thus, in one preferred embodiment, has a diameter in the range of 2.29-2.67 mm (0.09-0.105 inch), most preferably 2.49 mm (0.098 inch). Alternatively, other diameters are equally acceptable, so long as the leading section 50 can be positioned within the fillport through hole 40 as shown. The leading section 50 further terminates at a leading surface 56 that is preferably flat for receiving the closing button 46 as described in greater detail below.

The trailing section 52 extends from the leading section 50, and preferably defines an outer diameter less than that of the leading section 50. For example, in one preferred embodiment, the trailing section 52 defines an outer diameter in the range of 1.52-2.03 mm (0.06-0.08 inch), more preferably 1.75 mm (0.069 inch). Alternatively, other dimensions are acceptable, and the trailing section 52 can define an outer diameter that is equal to, or greater than, that of the leading section 50. Regardless, the trailing section 52 terminates at a trailing surface 58. Further, a shoulder 60 is preferably defined at the transition from the trailing section 52 to the leading section 50.

The passageway 54 defined by the fill tube 42 is sized in accordance with a diameter of the ball 44. In particular, the passageway 54 has a diameter slightly smaller than that of the ball 44 such that the ball 44 can be press-fitted within the passageway 54 as described below. For example, with a preferred ball 44 diameter of 0.7937 mm (0.03125 inch), the passageway 54 has a preferred diameter of 0.737 mm (0.029 inch). Notably, this one preferred passageway 54 diameter of 0.737 mm (0.029 inch) has surprisingly been found amenable to available electrolyte charging or filling procedures, but is significantly smaller than available fill tube passageway diameters typically on the order of 1.52 mm (0.06 inch). Of course, the passageway 54 diameter can vary depending upon a size of the ball 44. Additionally, an overall longitudinal height or length of the passageway 54 approximates, or preferably is slightly greater than, a diameter of the ball 44. Once again, with reference to a preferred ball 44 diameter of 0.7937 mm (0.03125 inch), the passageway 54 preferably has a longitudinal length of approximately 0.813 mm (0.032 inch). While other lengths can be employed, the preferred axial length of the passageway 54 is significantly smaller than that associated with other fill tube configurations that otherwise establish a passageway length on the order of 2.03 mm (0.08 inch). In this regard, and as described in greater detail below, the leading section 50 is preferably configured to provide a longitudinal length sufficient to support the fill tube 42 within the fillport through hole 40, while minimizing an inward extension of the trailing section 52 relative to the cover 34. In one preferred embodiment, the leading section 50 has a longitudinal length in the range of 0.305-0.559 mm (0.012-0.022 inch), more preferably 0.432 mm (0.017 inch), whereas the trailing section 52 has a longitudinal length in the range of 0.25-0.51 mm (0.01-0.02 inch), more preferably 0.381 (0.015 inch). Finally, the passageway 54 is preferably enlarged or chamfered at both the leading and trailing surfaces 56, 58.

In addition to the various preferred dimensional attributes described above, the fill tube 42 is further formed from a material selected in accordance with a material of the ball 44. More particularly, the ball 44 material is preferably harder than the material selected for the fill tube 42. This one preferred construction facilitates formation of a liquid tight seal between the ball 44 and the fill tube 42 upon press-fitting of the ball 44 within the passageway 54, as the fill tube 42 will effectively plastically deform about the ball 44. With this in mind, and in one preferred embodiment, the fill tube 42 is preferably formed of a Grade 2 titanium material, whereas the ball 44 is preferably formed of a Grade 5 titanium material. Alternatively, other materials may also be employed.

The closing button 46 is sized in accordance with a diameter defined by the fillport through hole 40, and is formed from an acceptable material such as stainless steel or titanium. Unlike previous designs, however, the closing button 46 has a thickness or height that is less than that of the cover 34 in the region of the fillport through hole 40.

With additional reference to FIG. 1, assembly of the electrochemical cell 10 includes providing the case 32 (e.g., a deep drawn technique), and assembly of various internal components therein (e.g., the anode 18 and the cathode 20) in accordance with available techniques. The cover 34 is likewise provided, sized in conjunction with a size and configuration of the case 32. In this regard, the cover 34 may include a number features, such as the feedthrough opening 36, but is formed to include the fillport through hole 40. In this regard, the cover 34 need not be precisely machined. Instead, the cover 34, and in particular the fillport through hole 40, can be formed by a relatively inexpensive manufacturing process.

The fill tube 42 is then sealed to the cover 34, and in particular within the fillport through hole 40. In this regard, the cover 34 generally defines an outer face 70 and an inner face 72 (with the terms "outer" and "inner" being in reference to a position of the cover 34 relative to the internal volume 30 upon final assembly). With this designation in mind, the leading section 50 of the fill tube 42 is positioned within the fillport through hole 40 such that the shoulder 60 is approximately aligned with the inner face 72 of the cover 34. The fill tube 42 is then sealed to the cover 34, for example, via a weld (referenced generally at 74). Thus, at least a portion of the fill tube 42 (e.g., the leading section 50) is disposed within the fillport through hole 40, and only a portion of the fill tube 42 (e.g., the trailing section 52) extends inwardly (relative to the orientation of FIG. 1) relative to the inner face 72 of the cover 34. Notably, this is in direct contrast to previous designs in which an entirety of the fill tube 42 extends downwardly from the inner face 72.

The combination cover 34/fill tube 42 is then assembled or sealed to the case 32 as shown, with the cover 34 encompassing an opening 76 (referenced generally in FIG. 1) otherwise defined by the case 32. For example, the cover 34 can be welded to the case 32. The fill tube 42 construction in accordance with the present invention dramatically reduces the amount of headspace volume occupied by the fill tube 42. By way of reference, previous fill tube-type sealing assembly designs incorporate a fill tube having a longitudinal length, and thus downward extension relative to the cover 34, of approximately 2.03 mm (0.08 inch). Conversely, the present invention preferably provides a downward extension of less than 2.03 mm (0.08 inch). That is to say, upon final assembly, the trailing surface 58 extends less than 2.03 mm (0.08 inch), more preferably less than 1.27 mm (0.05 inch), from a plane defined by the inner face 72 in the region of the fillport through hole 40 (it being understood that depending upon a particular design, region(s) of the cover 34 apart from the fillport through hole 40 may define a "lower" point or plane). In an even more preferred embodiment, the fill tube 42 is configured such that the trailing surface 58 extends approximately 0.381 mm (0.015 inch) relative to the inner face 72 at the fillport through hole 40. Preferably, however, the fill tube 42 is configured such that upon final assembly, the leading section 50 does not encompass an entirety of the cover's 34 thickness. With this preferred construction, sufficient room is available for subsequent assembly of the closing button 46 as described below.

With the cover 34 assembled to the case 32, the electrolyte 16 is then charged or dispensed into the enclosed region 30 via the fillport through hole 40 and the passageway 54, as is known in the art.

Once a desired volume of the electrolyte 16 has been dispensed within the enclosed region 30, the ball 44 is press-fitted or interference-fitted into the passageway 54 of the fill tube 42. Once again, and in a preferred embodiment, the ball 44 is formed of the material harder than that of the fill tube 42 and defines a slightly greater diameter than that of the passageway 54 such that this press-fitting operation results in a seal being formed between the ball 44 of the fill tube 42. The seal achieved between the ball 44 and the fill tube 42 is hereinafter referenced as the "secondary seal" or "lower seal" (relative to the orientation of FIG. 1), and seals the electrolyte 16 within the internal volume 30. This secondary seal prevents the electrolyte 16 from passing or leaking beyond (or downstream of) the ball 44. In a preferred embodiment, the ball 44 is sized to be slightly smaller than a longitudinal height of the passageway 54 (e.g., preferably in the range of 0.00635-0.025 mm (0.00025-0.001 inch); more preferably approximately 0.0190 mm (0.00075 inch)), such that an entirety of the ball 44 is contained within the passageway 54. That is to say, in a preferred embodiment, the ball 44 does not extend beyond (or below relative to the orientation of FIG. 1) the trailing surface 58, and thus does not unnecessarily occupy available headspace volume. Additionally, the ball 44 is preferably positioned within the passageway 54 in approximate alignment with a plane defined by the leading surface 56. By preferably forming the fill tube 42 from a Grade 2 titanium material and the ball 44 from a Grade 5 titanium material, the secondary seal provides a helium leak rate of less than $1 \times 10^{-7}$ std. cc/second.

After the ball 44 has been inserted, a portion of the fillport through hole 40 not otherwise occupied by the fill tube 42 is preferably cleaned, and the closing button 46 inserted therein. In a preferred embodiment, an interior surface 78 of the closing button 46 abuts or rests on top of the leading surface 56 of the fill tube 42, whereas an exterior surface 80 is substantially flush with the outer face 70 of the cover 34. Thus, the fill tube 42 serves to not only support the ball 44, but also the closing button 46. Further, and as previously described, the ball 44 is preferably positioned within the passageway 54 so as to be substantially aligned with a plane of the leading surface 56. As such, upon placement of the closing button 46 against the leading surface 56, the closing button 46 is in highly close proximity to the ball 44. In one preferred embodiment, a spacing between the closing button 46 and the ball 44 is less than approximately 0.0190 mm (0.00075 inch); more preferably, the closing button 46 contacts the ball 44.

Once positioned, the closing button 46 is sealed to the cover 34, such as by a weld 82 (referenced generally in FIG. 2). The preferred weld 82 establishes a primary seal (or "upper seal" relative to the orientation of FIG. 1) for the fillport through hole 40. Because the secondary seal established between the ball 44 and the fill tube 42 prevents passage of the electrolyte 16 (in either liquid or gaseous form) into the closing button weld zone, the primary seal will consistently provide a helium leak rate of less than $1 \times 10^{-7}$ std. cc/second.

The electrochemical cell, and in particular fillport sealing assembly, of the present invention provides a marked improvement over previous designs. The fill tube configuration and assembly provides a low profile design in which only a minimal amount of available headspace volume is occupied by the fill tube as compared to previous designs. As a result, the size of other active components (e.g., the electrode) can be increased, thereby increasing an available energy of the electrochemical cell. By incorporating the sealing assembly of the present invention, then, available electrochemical cell can be dramatically reduced in overall size with minimal impact on energy capacity. Further, the primary and secondary seals achieved with the present invention provide a helium leak rate of less than $1\times10^{-7}$ std. cc/second, such that the chances of electrolyte leaking from the cell enclosure are greatly reduced, surprisingly to a level whereby the gross leak detection afforded by glass bubbles (or other getter material) is no longer necessary. In effect, both seals would have to leak for electrolyte leakage to occur. Thus, the electrochemical cell is highly useful for a variety of applications, and in particular for use with implantable medical devices.

Thus, embodiments of the electrochemical cell with fillport sealing assembly are disclosed. One skilled in the art will appreciate that the invention can be practiced with embodiments other than those disclosed. The disclosed embodiments are presented for purposes of illustration and not limitation, and the present invention is limited only by the claims that follow.

What is claimed is:

1. A method of forming an electrochemical cell including an anode and a cathode, the method comprising:
    providing a case defining an upper opening;
    providing a cover defining an outer face, an inner face opposite the outer face, and a fillport through hole, the fillport through hole formed as a passage through a thickness of the cover between the outer face and the inner face;
    forming a fill tube apart from the cover, the fill tube defining a leading section, a trailing section, and a passageway, the passageway being within the fill tube;
    securing the leading section of the fill tube within the fillport through hole such that the passageway is fluidly open to the fillport through hole;
    sealing the cover to the case at the upper opening, the housing and the cover combining to define an internal volume;
    dispensing an electrolyte into the internal volume via the fill tube passageway; and sealing the fillport through hole.

2. The method of claim 1, wherein securing the leading section of the fill tube within the fillport through hole includes welding the fill tube to the inner face of the cover.

3. The method of claim 2, wherein a transition of the trailing section to the leading section defines a shoulder, and further wherein welding the fill tube includes welding the shoulder to the inner face, with the leading section extending above the weld and the trailing section extending below the weld.

4. The method of claim 3, wherein following the step of securing the leading section of the fill tube within the fillport through hole, the shoulder is approximately flush with the inner face of the cover.

5. The method of claim 1, wherein sealing the fillport through hole includes:
    press-fitting a ball into the passageway of the fill tube to form a secondary seal; and
    placing a closing button into the fillport through hole.

6. The method of claim 5, wherein the closing button defines an interior surface and an exterior surface, and further wherein placing the closing button within the fillport through hole includes abutting the interior surface against the fill tube.

7. The method of claim 5, wherein the leading section of the fill tube terminates at a leading surface, and further wherein press-fitting the ball within the passageway includes approximately aligning a surface of the ball with a plane of the leading surface.

8. The method of claim 5, wherein sealing the fillport through hole further includes:
    securing the closing button to the cover to form a primary seal.

9. The method of claim 8, wherein securing the closing button includes welding the closing button to the cover.

10. A method of manufacturing an implantable medical device, the method comprising:
    providing an electrochemical cell by:
        providing a case defining an upper opening,
        providing a cover defining an outer face, an inner face and a fillport through hole,
        forming a fill tube apart from the cover, the fill tube defining a leading section, a trailing section, and a passageway,
        securing the leading section of the fill tube within the fillport through hole such that the passageway is in fluid communication with the fillport through hole,
        sealing the cover to the case at the upper opening, the housing and the cover combining to define an internal volume,
        dispensing an electrolyte into the internal volume via the fill tube passageway, and
        sealing the fillport through hole; and
    assembling the electrochemical cell within an implantable medical device housing.

11. The method of claim 1, wherein securing the leading section of the fill tube includes assembling the fill tube to the cover such that the leading section is within the thickness of the cover and the trailing section projects outwardly beyond the cover.

* * * * *